June 2, 1942.	J. A. MURDOCK	2,285,381
KITCHEN UTENSIL
Filed July 1, 1940
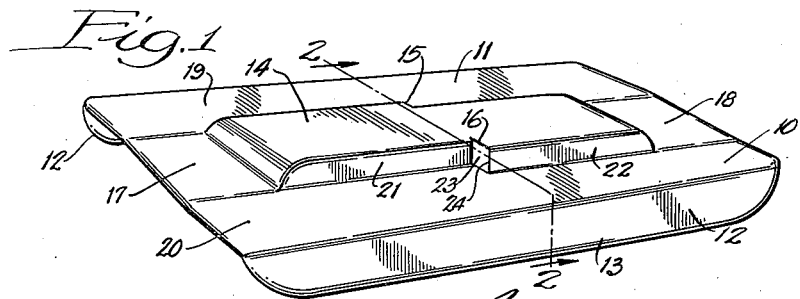
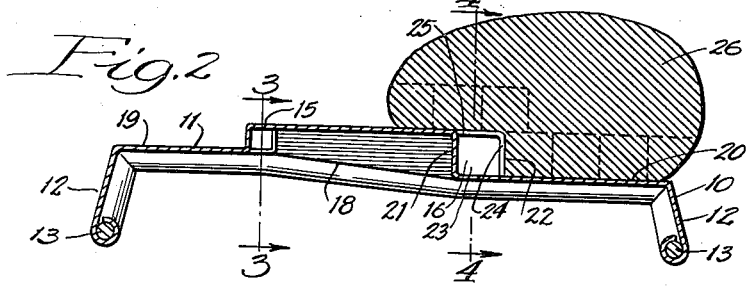
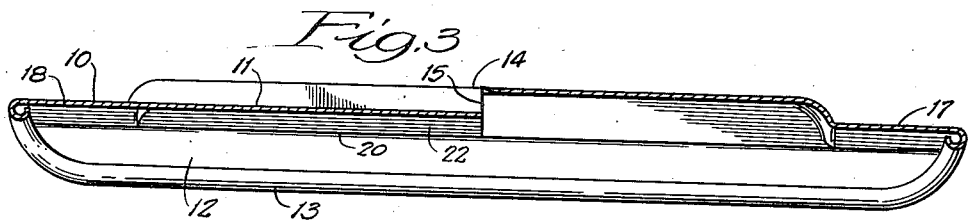
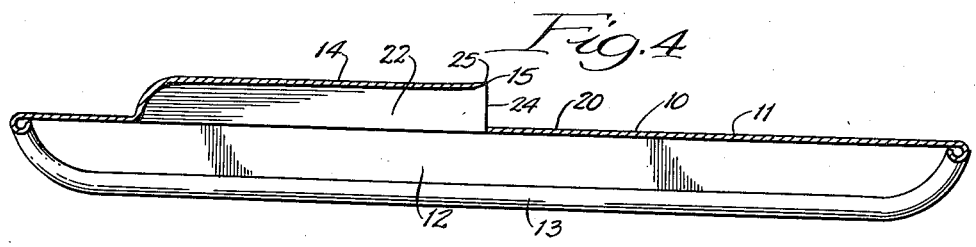
Inventor:
James A. Murdock,
By Dawson Orms and Roth,
Attorneys.

Patented June 2, 1942

2,285,381

UNITED STATES PATENT OFFICE 2,285,381

KITCHEN UTENSIL

James A. Murdock, Chicago, Ill.

Application July 1, 1940, Serial No. 343,405

7 Claims. (Cl. 146—171)

This invention relates to kitchen utensils and has for its object to provide an improved kitchen utensil for the slicing of vegetables.

A further object of the invention is to provide an improved kitchen utensil which can be made as a portable unit, which can be easily and cheaply constructed, and which is easy to operate.

A further object of this invention is to provide a kitchen utensil of this type which has no exposed sharp blades which require sharpening, replacement or adjustment.

A further object of the invention is to provide a kitchen utensil of this character in which, as the vegetable is being sliced, the severing of each slice will prepare the vegetable for the next operation.

A further object of the invention is to provide a kitchen utensil of this character which can be employed to slice vegetables into long slices or to cut them into cubes in such a manner that the slices produced will be of the greatest possible uniformity and the waste occasioned by the irregular surface of the vegetable being sliced will be reduced to the minimum.

A further object of the invention is to circumvent the difficulty which is encountered in vegetable slicers which are designed to cut a large number of strips at a single operation. These devices require the application of substantial force to the object being cut and, unless the cutting member is made of material of substantial thickness, this pressure may be destructive of the kitchen utensil. If the blades are made of the requisite thickness their passage through the vegetable being cut is made exceedingly difficult. Where a number of cutting members operate upon the vegetable at the same time, the blades must simultaneously pass through the vegetable and the vegetable must be compressed to accommodate the total of the thickness of the several strips of metal which must pass through the vegetable. This compression of the vegetable body not only increases the difficulty with which the blade member are forced through the vegetable, but also destroys the cellular structure of the portions of the vegetable about the blade and impairs the quality of the food. Thus, in the case of potatoes being prepared for French frying, as the potato is forced through a cutter with a number of blades, which attempt to cut several longitudinal strips at one time, the compression of the strips between adjacent cutting members destroys the structure of the potato and toughens it when it is prepared for consumption.

It is thus the object of this invention to provide a device in which the strip is cut from the body of the vegetable in a single operation and in which the strips being cut are never compressed between unyielding members.

Other objects, advantages and capabilities of the invention will appear from the following description of a preferred embodiment thereof, taken in conjunction with the accompanying drawing in which:

Figure 1 is a view in perspective of the kitchen utensil;

Fig. 2 is a transverse sectional view taken on the line 2—2 of Fig. 1 showing in section a potato applied to the cutting member of the kitchen utensil;

Fig. 3 is a longitudinal sectional view taken on the line 3—3 of Fig. 2 showing the formation of the cutting member in a preferred embodiment of the invention;

Fig. 4 is a longitudinal sectional view taken on the line 4—4 of Fig. 2.

Referring to the drawing, the reference numeral 10 designates the body of the kitchen utensil. The body is preferably composed of a suitable base member 11. In the embodiment shown it is stamped from a flat sheet metal plate, flanged along its sides to form the upright flanges 12 which serve as supports for the base member 11 at a sufficient elevation above the table upon which the kitchen utensil is designed to be operated so that the portions of the vegetable being severed from its body may pass beneath the kitchen utensil and out of the way of subsequent portions being severed from the vegetable. In the embodiment shown in the drawing the base plate 11 is also provided with a wire framework 13 which is formed so as to follow the edges of the base member 11 and to provide a rigid skeleton to increase the rigidity of the kitchen utensil. Obviously this wire frame 13 may be omitted and the base 11 and flanges 12 formed of metal of suitable thickness to support the kitchen utensil.

Above the base plate 11 is a raised portion or platform 14 stamped or embossed above the plane of the base to form the cutting members, of which two, 15 and 16 are shown. While in the embodiment illustrated in the drawing these are shown as stamped from the base plate 11 and as an integral part thereof, these cutting members may be made separately and affixed to the base 11 by welding or other familiar methods of attachment.

The cutting members 15 and 16 shown in Fig. 1 of the drawing are identical in form and differ only in dimensions so that the utensil may be employed to cut vegetable strips of correspondingly different sizes. As both of these cutting members are constructed and operated in the same manner, only one of them will be described in detail.

In order to provide for the mounting of the two cutting members 15 and 16 upon the single base plate 11, the base plate 11 has been formed throughout its length to provide for the rises 17 and 18. Thus the portion of the base plate indicated by the numeral 19 is higher than the other portion 20, which is adjacent to the cutter 16.

The cutter 16 is shown L-shaped in form. Obviously, without modifying the principles of its construction and operation, this form can be changed into other simple angular or circular forms, provided that the form of cutter employed has a cutting edge parallel to the vegetable engaging surface of the platform adjacent thereto.

In the embodiment shown, the portion 20 of the base plate 11 extends on a horizontal plane from the edge of the kitchen utensil at the flange 12 until it rises in the form of the vertical walls 21 and 22 of the platform 14. It is to be noted that the vertical wall 21, hereafter called the guide wall 21, is spaced from the vertical wall 22 the width of the square opening 23 which is formed by the termination of the base portion 20 of the plate 11, the termination of the guide wall 21, the forward edge 24 of the wall 22, and the forward edge 25 of the platform 14 of the kitchen utensil. Only the edges 24 and 25 serve as cutting edges.

In the preferred form of this structure the edge 25, which forms the horizontal cutter, is formed out of the plane of the platform 14 so that at the extreme edge the lower surface of the cutter 25 will be on the plane of the upper surface of the platform 14. This formation can be effected by forming the forward edge of the blade in the stamping operation so that its lower surface is level with the upper surface of the platform 14; or the edge can be subsequently stamped or stamped and ground into the configuration shown in Fig. 4. Similarly, the cutter 15 is preferably formed to the same configuration, as indicated in Fig. 3. The purpose of this feature will be described in the description of the operation of this device.

*Operation of the kitchen utensil*

When it is desired to operate the kitchen utensil it can be placed upon a horizontal surface with the opening in the cutter member facing the operator. Thus, with the device standing in the position in which it is shown in Fig. 1, the operator would stand to the left of the drawing. The vegetable, which is suggested as a potato in the sectional representation in Fig. 2, is placed upon the portion of the base 11 nearest the operator and in front of the opening. In Fig. 2 the potato 26 is shown placed upon the side portion 20 of the base 11 after several cutting operations have been performed.

When the side of the potato in this position is forced snugly against the guide wall 21 and its base held firmly on the plate 11, the potato can be pushed forward and the cutting edges 24 and 25 will make a right angular cut as the potato moves forward. The cut faces of that portion of the potato which remains outside of the cutter 16 will bear respectively against the surfaces of the vertical wall 22 and the platform 14, the severed strip of the potato being free to pass beneath the base 11.

After the full length of the potato has passed beyond the cutting edges 24 and 25, the severed strip will be freed of the potato. The cut surfaces of the remaining portion of the potato will conform to the configuration of the part of the utensil formed by the wall 22 and its adjacent portion of the platform 14 as well as that formed by the guide wall 21 and its adjacent portion of the platform 14. The wall 22 and adjacent surface of the platform 14 will serve to keep the potato parallel to the wall 22 and so guide it as to insure the uniformity of the cut throughout the length thereof.

Thus when the vegetable is drawn back and again applied to the cutter, the cut surfaces will bear against the guide wall 21 and the platform 14, and thus insure that the next cut will be of exactly the form of the opening 23. Each succeeding strip is thus necessarily of uniform section.

Because of the deformation of the cutting edge 36, the horizontal cut surface of the vegetable 26 is exactly level with the upper surface of the platform 14. This not only facilitates the application of the vegetable to the kitchen utensil for the succeeding cut, but insures that the lower surface of the vegetable 26 will bear on the base portion 20 at the same time that the higher cut surface of the vegetable will bear against the platform 14. Obviously, this formation insures perfect registration of each succeeding cut of the vegetable 26 and insures that each cut of the vegetable will be of identical sectional dimensions and shape.

If it is desired to cut the potato strips into cubes, this can readily be done by laying a number of the strips upon the portion 20 of the base 11 and transverse to the longitudinal axis of the kitchen utensil with their respective ends against the guide wall 21, and forcing the strips against the cutter 16. The cutting edge 24 will sever a small cube from the end of the strip. This operation can be repeated until the strips are wholly reduced to cubes.

If the vegetable is to be cut into strips other than those rectangular or square in section, the edges 24 and 25 must be formed to the desired shape and the corresponding guide wall 21 and wall 22 and the platform 14 of the kitchen utensil must be similarly formed. One of the cutting edges must also be sufficiently deformed to insure that as each cut is made the remaining portion of the vegetable can be applied to the cutter with the cut surfaces bearing snugly against the base and guide wall.

Although the invention has been disclosed in connection with the specific details of a preferred embodiment thereof, it must be understood that such details are not intended to be limitative of the invention except insofar as set forth in the accompanying claims.

Having thus described my invention, what I claim as new and desire to secure by Letters Patent of the United States is:

1. A vegetable cutter comprising a base, a horizontal platform above said base, a vertical guide wall connecting said platform and said base, a cutter projecting beyond said guide wall and above said base and having a vertical cutting edge parallel to said guide wall and a horizontal cutting edge parallel to said platform, the horizontal cutting edge being raised to cut at the plane of the upper surface of the platform.

2. A vegetable cutter comprising a base, a horizontal platform above said base, a vertical guide wall rising to said platform from said base, a vertical knife parallel to said guide wall and spaced therefrom, a horizontal knife parallel to said base and spaced therefrom and having its lower cutting edge on the plane of the upper surface of said platform.

3. A vegetable cutter comprising a base, a guide member upon said base having one horizontal and one vertical vegetable engaging surface, a cutter affixed to said base having a vertical cutting edge parallel to the vertical vegetable engaging surface of said guide member and a horizontal cutting edge parallel to the horizontal vegetable engaging surface of said member, the horizontal edge of said cutter being so arranged as to cut the vegetable at the plane of the upper surface of the horizontal vegetable engaging surface.

4. A vegetable cutter comprising a base, guide members upon said base having one horizontal and one vertical vegetable engaging surface, a cutter affixed to said base between said guide members and having a vertical cutting edge parallel to the vertical vegetable engaging surface of said guide members and a horizontal cutting edge parallel to the horizontal vegetable engaging surface of said guide members, the horizontal edge of said cutter being so arranged as to cut the vegetable at the plane of the upper surface of the horizontal vegetable engaging surface of the guide member which engages the vegetable before it reaches the cutter.

5. A vegetable cutter comprising a base, and leading and trailing guide members mounted upon said base and each composed of a horizontal and a vertical wall, said guide members being mounted with their respective walls parallel to each other in substantially end-to-end relation but offset from each other so that the edges of the walls of said trailing guide member form exposed cutters, one of said cutters being raised so as to cut at the plane of the upper surface of the corresponding wall of the leading guide member.

6. A vegetable cutter comprising a base, and a leading guide member and a trailing guide member mounted upon said base in substantially end-to-end relation, said guide members each composed of a pair of walls forming bearing surfaces, one of said walls being continuous to form a wall and bearing surface for both guide members and the other wall on the trailing guide member being parallel to but offset from the corresponding wall of the leading guide member, the exposed edges of the walls of the trailing guide member forming cutters, and the exposed edge of the continuous wall being raised to cut at the plane of the upper surface of said wall.

7. A vegetable cutter comprising a sheet of rigid material forming a base and having a portion thereof offset from the base and connected to the base by wall portions extending at substantially a right angle thereto, said wall portions being severed and adjacent the line of severance thereof being offset from each other in the plane of the base and connected to each other by a wall portion substantially parallel to the base, to form an opening through the sheet, the exposed edges of the sheet adjacent said opening forming cutting edges.

JAMES A. MURDOCK.